(12) United States Patent
Matlin et al.

(10) Patent No.: US 11,128,936 B2
(45) Date of Patent: Sep. 21, 2021

(54) THERMAL TRANSMITTING INDICATOR

(71) Applicants: Mark D. Matlin, Boulder, CO (US); Dean Carnell Sanders, Clements, CA (US); Donald Gene Ferguson, Boulder, CO (US); Steven Richard Wenande, Longmont, CO (US)

(72) Inventors: Mark D. Matlin, Boulder, CO (US); Dean Carnell Sanders, Clements, CA (US); Donald Gene Ferguson, Boulder, CO (US); Steven Richard Wenande, Longmont, CO (US)

( * ) Notice: Subject to any disclaimer, the term of this patent is extended or adjusted under 35 U.S.C. 154(b) by 0 days.

(21) Appl. No.: 16/838,226

(22) Filed: Apr. 2, 2020

(65) Prior Publication Data
US 2020/0322700 A1    Oct. 8, 2020

Related U.S. Application Data

(60) Provisional application No. 62/829,469, filed on Apr. 4, 2019.

(51) Int. Cl.
| | |
|---|---|
| *H04Q 9/00* | (2006.01) |
| *G01K 1/024* | (2021.01) |
| *G01K 3/00* | (2006.01) |
| *G01K 7/02* | (2021.01) |
| *G08B 21/18* | (2006.01) |
| *G08B 21/02* | (2006.01) |
| *G01V 9/00* | (2006.01) |

(52) U.S. Cl.
CPC .............. *H04Q 9/00* (2013.01); *G01K 1/024* (2013.01); *G01K 3/005* (2013.01); *G01K 7/02* (2013.01); *G01V 9/00* (2013.01); *G08B 21/02* (2013.01); *G08B 21/182* (2013.01); *H04Q 2209/40* (2013.01); *H04Q 2209/823* (2013.01)

(58) Field of Classification Search
CPC ................ H04Q 9/00; H04Q 2209/40; H04Q 2209/823; G01K 1/024; G01K 3/005; G01K 7/02; G01V 9/00; G08B 21/02; G08B 21/182

See application file for complete search history.

(56) References Cited

U.S. PATENT DOCUMENTS

| | | | |
|---|---|---|---|
| 5,033,864 A * | 7/1991 | Lasecki ................. | A61J 17/103 374/151 |
| 5,317,598 A * | 5/1994 | Cahalan .............. | H04L 27/2272 340/12.32 |
| 5,927,599 A * | 7/1999 | Kath .................. | G05D 23/1905 236/47 |

(Continued)

*Primary Examiner* — Joseph H Feild
*Assistant Examiner* — Rufus C Point
(74) *Attorney, Agent, or Firm* — Kenneth Altshuler

(57) ABSTRACT

Described is a transformer end-of-life thermal transmitting indicator (thermal transmitting indicator) that is configured and well suited for monitoring the health of a transformer and communicating the health of the transformer to an end user by way of a cellular transceiver. The thermal transmitting indicator can be configured to alert nearby people of an impending transformer explosion if the transformer fails. The thermal transmitting indicator is also arranged to transmit any problems or impending danger from the transformer to the end user who can then respond by preemptively dealing with the failing transformer.

15 Claims, 8 Drawing Sheets

(56) References Cited

U.S. PATENT DOCUMENTS

| | | | | |
|---|---|---|---|---|
| 6,225,916 | B1* | 5/2001 | Sugimoto | G08C 19/28 340/12.17 |
| 7,067,740 | B1* | 6/2006 | Belov | H02G 15/117 174/135 |
| 7,672,106 | B1* | 3/2010 | Sullivan | H05B 39/02 361/93.8 |
| 10,852,049 | B2* | 12/2020 | Yi | F25D 17/065 |
| 2002/0103875 | A1* | 8/2002 | Krishnan | H04L 67/02 709/217 |
| 2003/0163287 | A1* | 8/2003 | Vock | A61B 5/1118 702/187 |
| 2004/0095276 | A1* | 5/2004 | Krumm | G01S 5/0252 342/465 |
| 2006/0000277 | A1* | 1/2006 | Pietrorazio | G01F 23/0076 73/293 |
| 2007/0068922 | A1* | 3/2007 | Westfield | G01L 19/04 219/447.1 |
| 2008/0191863 | A1* | 8/2008 | Boling | G08B 25/08 340/521 |
| 2009/0284380 | A1* | 11/2009 | Chen | G01K 1/02 340/584 |
| 2011/0216453 | A1* | 9/2011 | Haines | H02H 9/00 361/49 |
| 2011/0257924 | A1* | 10/2011 | Bryant | H01F 27/402 702/122 |
| 2012/0049734 | A1* | 3/2012 | Ito | H01J 61/56 315/32 |
| 2013/0024131 | A1* | 1/2013 | Lamontagne | H01F 27/402 702/24 |
| 2013/0158897 | A1* | 6/2013 | Jain | G01R 31/62 702/42 |
| 2013/0198428 | A1* | 8/2013 | Kreuzer | G06F 13/4291 710/110 |
| 2016/0234658 | A1* | 8/2016 | Tillet | H04W 72/048 |
| 2017/0188912 | A1* | 7/2017 | Halac | A61B 5/14532 |
| 2017/0327086 | A1* | 11/2017 | Katou | G08C 17/02 |
| 2018/0143237 | A1* | 5/2018 | Beaudet | H04Q 9/02 |
| 2020/0197928 | A1* | 6/2020 | Letourneau | B01L 3/54 |

* cited by examiner

THERMAL TRANSMITTING INDICATOR

CROSS-REFERENCE TO RELATED APPLICATIONS

This application is a non-provisional application claiming priority to and the benefit of U.S. Provisional Patent Application Ser. No. 62/829,469, entitled Thermal Transmitting Indicator filed Apr. 4, 2019, the entire disclosure of which is hereby incorporated by reference.

FIELD OF THE INVENTION

The present embodiments are generally directed to a utility level transformer early failure detection device.

DESCRIPTION OF RELATED ART

Aging infrastructure is an enormous problem in the United States (U.S.) and around the world today. Costs to replace or repair these aging infrastructures are so high that the only practical way to modernize is to replace failing infrastructure components across a number of infrastructure sectors one at a time. In the U.S. alone, infrastructure sectors span a vast network of structures and components that include bridges and roads, aquifers and electrical systems, just to name a few. Of the infrastructures that society most depends, the power grid infrastructure is clearly one of the most critical.

With special attention to the power grid, transformers include one of the many aging components that pose a particular threat. In general, a transformer is an electrical apparatus designed to convert alternating current from one voltage to another. It can be designed to "step up" or "step down" voltages and works on the magnetic induction principle. A transformer has no moving parts and is a completely static solid state device, which insures, under normal operating conditions, a long and trouble-free life. However, transformers eventually reach end-of-life, which is what is now happening in the power grid infrastructure across the US.

Though somewhat rare, when a transformer fails, it can explode. Older transformers possess insulating materials, such as cellulose and/or mineral oil designed to keep circuits cool, but when electrical wires begin to fail, often due to water exposure and general fatigue, the associated electrical resistance increases causing circuits to overheat and melt. This sometimes results in a shower of sparks, which can set the mineral oil or other insulating materials on fire thereby triggering an explosion. Given that the US expanded its power grid infrastructure in the 1950s and 1960s, most older transformers have met or are nearing the end of their operational lives, which is typically rated between 30 to 40 years.

It is to innovations related to this subject matter that the claimed invention is generally directed.

SUMMARY OF THE INVENTION

The present embodiments are generally directed to a utility level transformer early failure detection device and system of operation.

Certain embodiments of the present invention contemplate a transformer end-of-life thermal transmitting indicator comprising: a housing essentially comprised of a cover and a base, the cover and base connected together to form an interior space; in the interior space is a power supply adapted to provide power to a temperature sensor via a flexible electrical wire or circuit board trace and a cell phone transmitter, the temperature sensor external to the interior space; an antenna connected to the cell phone transmitter adapted to link to a cellular network, the thermal transmitting indicator adapted to obtain a plurality of temperature values from the temperature sensor and transmit a digital representation of one of the temperature values, via the cell phone transmitter, to an end user linked to the cellular network, the thermal transmitting indicator is configured to intermittently transmit the digital representation of the temperature values at a predefined time interval; and an on/off button comprised by the housing, when in an on state, the thermal transmitting indicator is configured to intermittently transmit one of the temperature values at a shortened time interval that is less than the predefined time interval.

Other certain embodiments of the present invention contemplate a method comprising: providing a transformer end-of-life thermal transmitting indicator that possesses a housing essentially comprised of a cover and base that form an interior space, an antenna extending from the housing, a temperature sensor that is externally connected to the housing via a wireline, an interior space with a power supply, a cell phone transmitter, a controller and a computer processor in which the wireline connects to the computer processor; attaching the temperature sensor an electrical device; the thermal transmitting indicator receiving a first temperature value from the temperature sensor while the temperature sensor is attached to the electrical device; transmitting the first temperature value to a consumer of data via a cell tower from the cell phone transmitter; after transmitting the first temperature value, receiving a second temperature value from the temperature sensor while the temperature sensor is attached to the electrical device; transmitting the second temperature value from the cell phone transmitter to the consumer of data via the cell tower at a standard time interval that is defined between the first temperature transmission and the second temperature transmission; after transmitting the second temperature value, receiving a third temperature value from the temperature sensor while the temperature sensor is attached to the electrical device; and transmitting the third temperature value from the cell phone transmitter to the consumer of data via the cell tower at the predefined standard time interval.

While other certain embodiments of the present invention contemplate a liquid sensing arrangement in a thermal transmitting indicator comprising: a housing essentially comprised of a cover and a base, the cover and base connected together to form an interior space; a printed circuit board entirely within the interior space, the printed circuit board attached to the base, the printed circuit board covering at least 75% of the base that is confined to the interior space, the printed circuit board defining an interior distance to a top surface of the cover in the interior space; a cell phone transmitter connected to the printed circuit board; a battery power supply within the interior space; a plurality of rigid pillars attached to the printed circuit board, the rigid pillars extending and terminating at a distal end to at least 50% of the interior distance; a liquid sensor disposed at essentially the distal end of each of the rigid pillars; each of the liquid sensors powered by the battery power supply, the liquid sensors configured to produce information of a presence of liquid in the interior space, the information of the presence of liquid is transmitted to the cell phone transmitter via the printed circuit board, the cell phone transmitter capable of transmitting a wireless signal corresponding to the information to a cell hub and from the cell hub to a recipient.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of utility health detector arrangements consistent with the spirit of the embodiments discussed infra. In what follows, similar or identical structures may (and may not) be identified using identical callouts.

Described herein are embodiments related to a transformer end-of-life thermal transmitting indicator (thermal transmitting indicator) that is configured and well suited for monitoring and communicating the health of a transformer to a party responsible for the transformer (end user) by way of a cellular transceiver. The thermal transmitting indicator can be configured to alert any nearby people of an impending transformer explosion if the transformer is deemed to be failing. The thermal transmitting indicator is also arranged to preemptively transmit sensor discovered problems or impending danger from the transformer to the end user who accordingly can safely deal with the failing transformer.

Figure 1A:
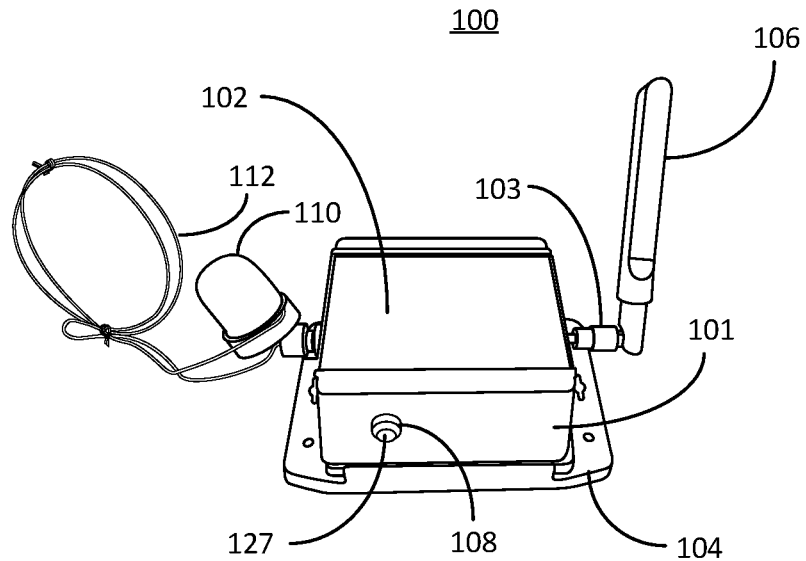
FIG. 1A is a line drawing that illustratively depicts of a front perspective view of a thermal transmitting indicator embodiment consistent with embodiments of the present invention.

FIG. 1A is a line drawing that illustratively depicts of a front perspective view of a thermal transmitting indicator embodiment consistent with embodiments of the present invention. The thermal transmitting indicator 100 can serve as a transformer end-of-life (EOL) indicator and communication device. As shown, the thermal transmitting indicator 100 generally comprises an enclosure 101 created by a top cover 102, a baseplate 104, and an antenna 106 that extends from the side of the top cover 102. As one skilled in the art will appreciate, an antenna is an essential component of all radio transmission equipment whereby the antenna 106 includes one or more conductor elements electrically connected to a receiver and/or transmitter. The position of the antenna 106 is adjustable by way of a swivel 103 (and in some embodiments, an articulating point). The thermal transmitting indicator 100 further includes a conductive sensor wireline 112 that is connected to a sensor 110. Certain embodiments envision a plurality of conductive sensor wirelines connected to a plurality of sensors, some of which may be different kinds of sensors. In the present embodiment, the thermal transmitting indicator 100 possesses a manual tool mode on/off button 108 and an LED 127 in the center of the button 108, or other light indicator, that serves as a tool mode indicator, discussed in more detail infra.

Figure 1B:
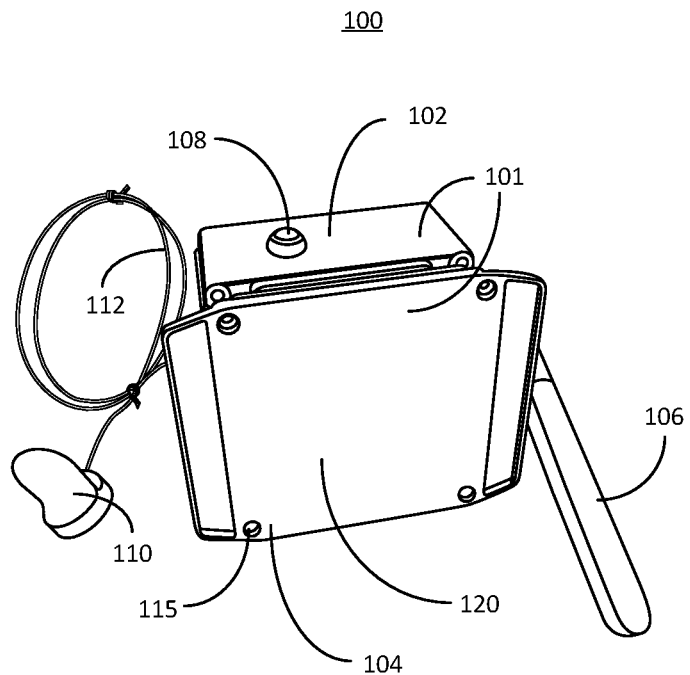
FIG. 1B is a line drawing that illustratively shows the underside of the thermal transmitting indicator of FIG. 1 consistent with embodiments of the present invention.

FIG. 1B is a line drawing that illustratively shows the underside 120 of the thermal transmitting indicator 100. From this perspective, the attachment locations 115 are shown located at each corner of the baseplate 104 where screws can lock the top cover 102 to the baseplate 104. Certain embodiments envision the top cover 102 and baseplate 104 creating an inner space that is essentially sealed from the outside environment. The antenna 106 is depicted swiveled in a different position than in FIG. 1A.

Figure 1C:
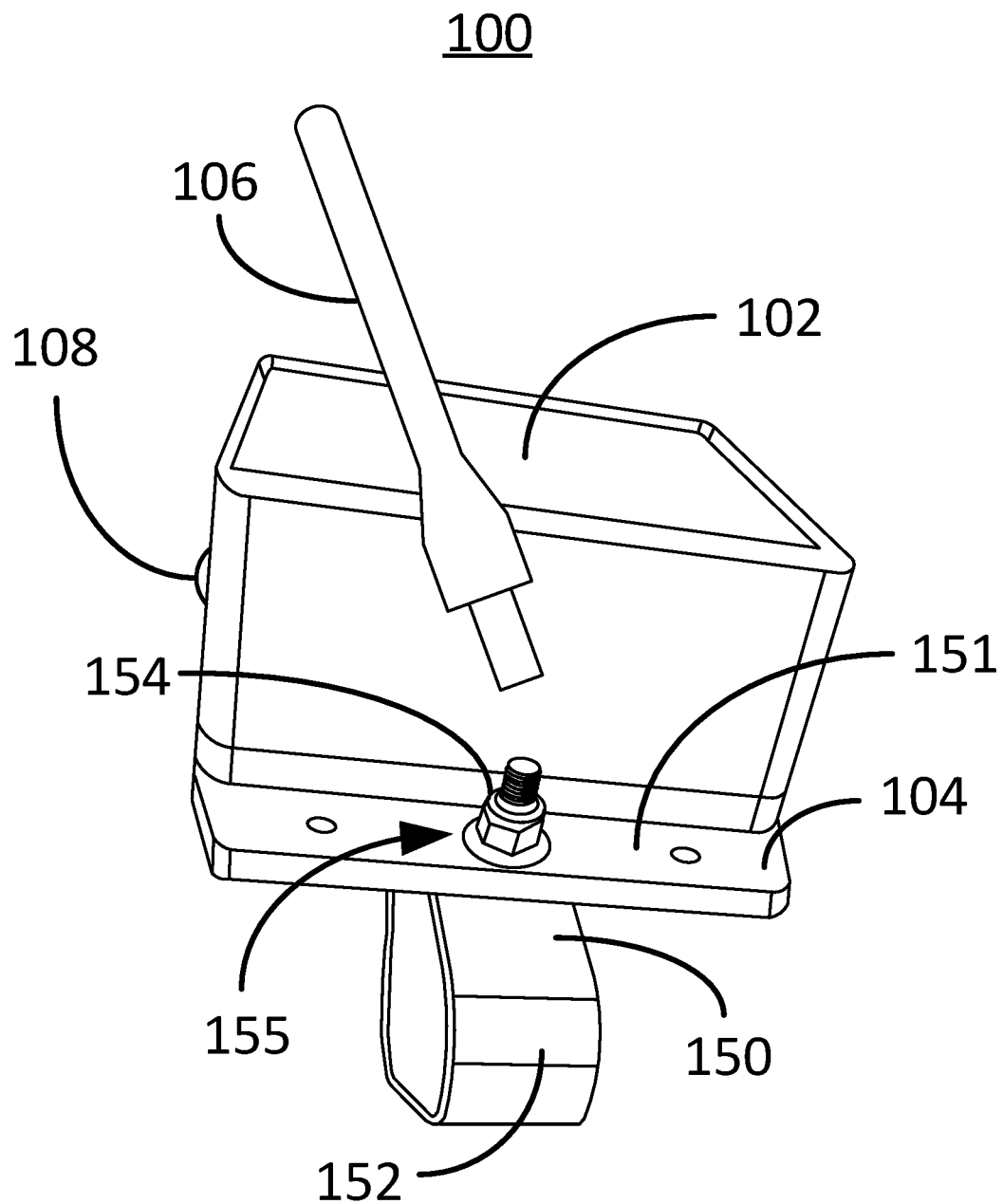
FIGS. 1C and 1D illustratively show the thermal transmitting indicator cooperating with a mounting bracket consistent with embodiments of the present invention.
Figure 1D:
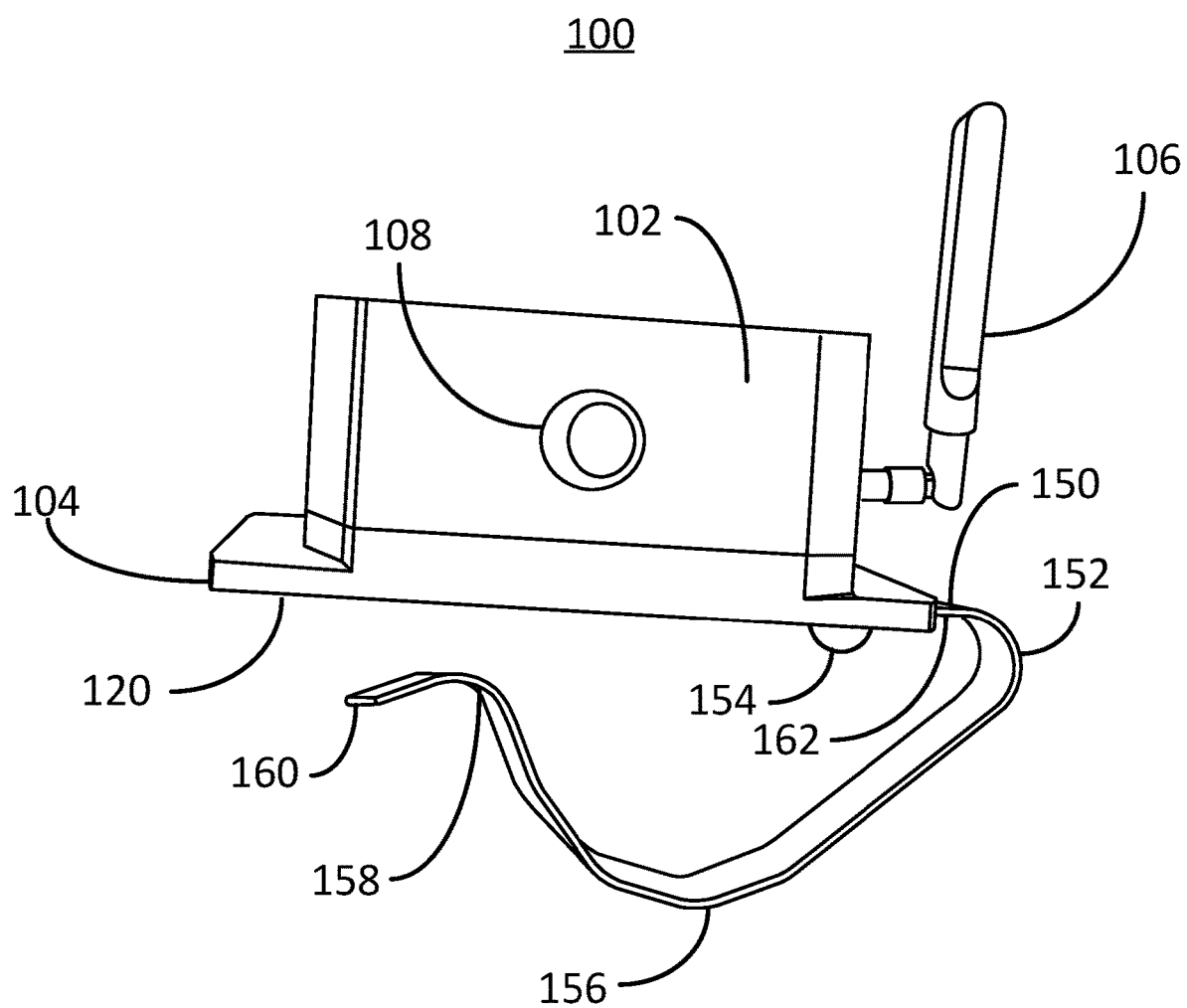

FIGS. 1C and 1D illustratively show the thermal transmitting indicator cooperating with a mounting bracket consistent with embodiments of the present invention. FIG. 1C is a front view photograph and FIG. 1D is a side view photograph. As shown, the mounting bracket 150 is attached to the baseplate 104 by way of a mounting bracket bolt 154 that is cooperating with an accommodating mounting bracket baseplate hole 155 in the flange 151. More specifically, the mounting bracket 150 is attached to the underside of the thermal transmitting indicator base 120 by a pair of mounting bracket bolts 154 cooperating with accommodating mounting bracket baseplate holes 155 spread along a mounting bracket flat portion 162 of the mounting bracket 150. In the present embodiment, the mounting bracket is defined by an upper bracket bend 152, a mounting bracket middle bend 156 and a mounting bracket distal bend 158 that is closest to distal mounting bracket end 160. The mounting bracket middle bend 156 is between the upper bracket bend 152 and the distal bracket bend 160. The mounting bracket is adapted to retain the thermal transmitting indicator 100 to a structural element in an industrial setting.

Figure 2:
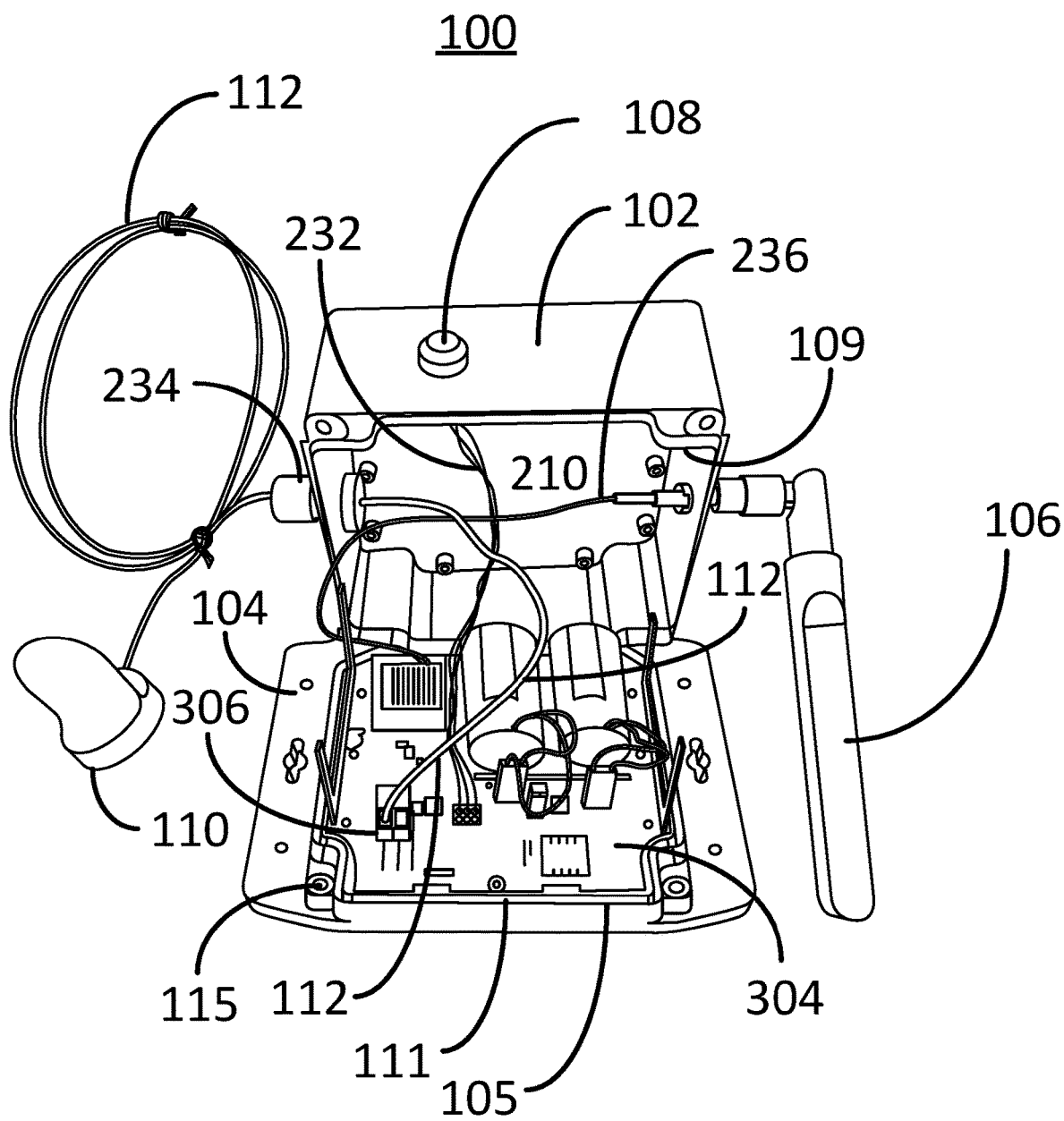
FIG. 2 is a line drawing that illustratively depicts the top cover, hinged open to reveal the inner elements of the thermal transmitting indicator of FIG. 1 consistent with embodiments of the present invention.

FIG. 2 is a line drawing that illustratively depicts the top cover 102 hinged open revealing the inner elements of the thermal transmitting indicator 100 consistent with embodiments of the present invention. The inner space 210 created by the top cover 102 and the baseplate 104 provides essentially a protected environment for the occupying components. The top cover 102 comprises a cover to base locking lip 109 that mates with an accommodating base to cover locking channel 105 formed in the baseplate 104. A rubber gasket 111 runs along the inside of the base to cover channel 105 while still preserving a portion of the cover locking channel 105 for the cover to base locking lip 109. The cover to base locking lip 109, base to cover locking channel 105 and locking gasket 111 help to provide an essentially sealed inner environment 210 when engaged. A printed circuit board (PCB) 304 is attached to the baseplate 104 within the boundary of the base to cover channel 105. The sensor wireline 112 passes into the inner space 210 by way of a wire strain reliever and gasket 234 that helps seal the inner space 210. The sensor wireline 112 is shown inside of the inner space 210 and connected to the PCB 304 by way of a PCB connector 306. The manual tool mode on/off button and LED 108 is connected to the PCB 304 via on/off button wirelines 232. The antenna 106 is connected to the PCB 304 (and more specifically to a transmission chip) via antenna wireline 236. Certain embodiments envision the manual tool mode on/off button 108 and antenna 106 being connected to the top cover 102 via a gasket system to help isolate the inner environment from the outer environment, the gasket system is constructed within the knowledge of those skilled in the art.

Figure 3:
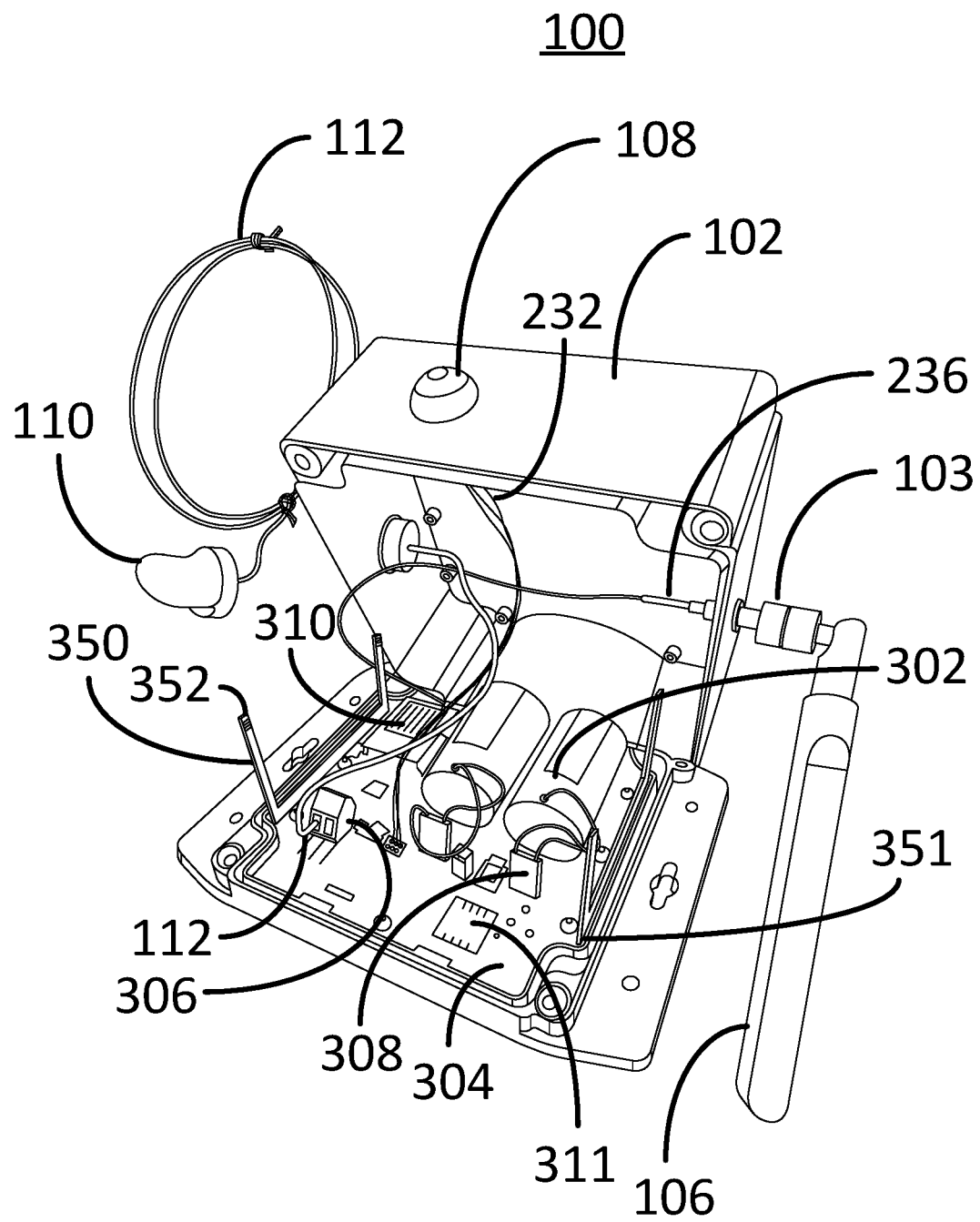
FIG. 3 is ¾ view line drawing that illustratively depicts the top cover, hinged open revealing the inner elements of the thermal transmitting indicator of FIG. 1 consistent with embodiments of the present invention.

FIG. 3 is a three-quarter view line drawing that illustratively depicts the top cover 102 hinged open thereby revealing the inner elements of the thermal transmitting indicator 100 consistent with embodiments of the present invention. With specific attention to the elements on the PCB 304, the two batteries 302 are connected to the PCB 304 via connectors 308. Accordingly, when connected power from the batteries is supplied to the other components that are also connected to the PCB 304, the two batteries 304 provide power to the other electronic components. The sensor wireline 112 is connected to the PCB 304 by way of a thermal sensor to PCB connector 306. Extending orthogonally towards the top cover 102 are four liquid ingress sensor supports (pillars) 350 that each comprise a liquid ingress sensor 352 on the distal/free ends. The antenna wireline 236 is connected to a cellular communications chip 310 that is configured and arranged to link communicatively with a cellular tower (cell phone tower) and to a cell network. Certain embodiments envision a non-transient nonvolatile memory 311, such as a flash memory, that can retain a plurality of time-stamped temperature measurements taken at select intervals from a power grid transformer, for example. Certain embodiments envision a humidity sensor on the circuit board that can detect a rise in humidity inside the enclosure that may indicate liquid ingress.

Figure 4:
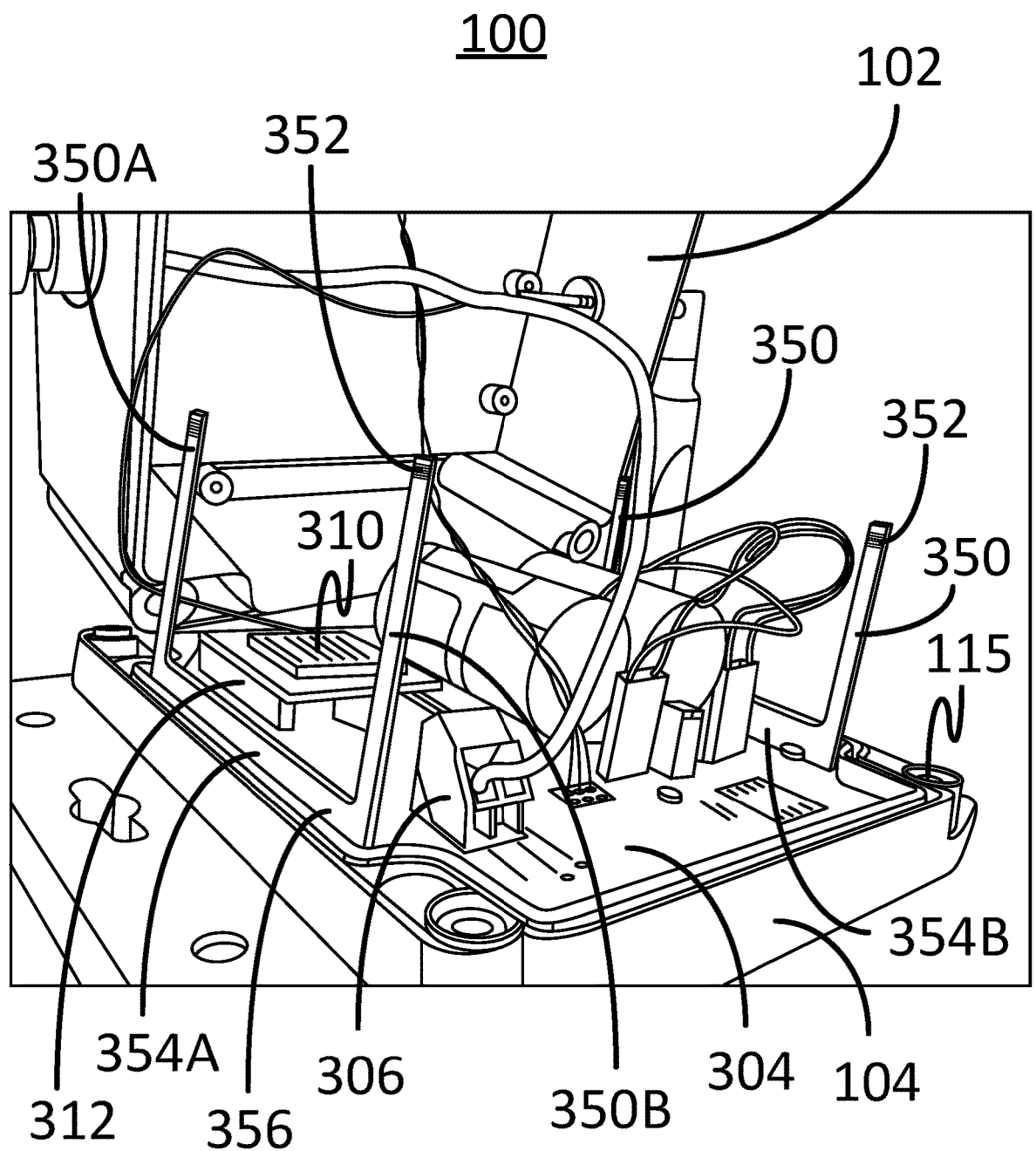
FIG. 4 is a perspective line drawing that illustratively depicts a framed portion of the thermal transmitting indicator the top cover, hinged open revealing certain inner elements of FIG. 1 consistent with embodiments of the present invention.

FIG. 4 it is a perspective line drawing that illustratively depicts a framed portion of the thermal transmitting indicator 100 with the top cover 102 hinged open, revealing certain inner elements consistent with embodiments of the present invention. With special attention to the liquid sensing arrangement 351, included are four liquid ingress sensors supports 350, the support pillars 350 extend orthogonally from the PCB 304 towards the top cover 102 with the ingress sensors 352 at the distal end in close proximity to the top cover 102 when the thermal transmitting indicator 100 is essentially sealed. In certain embodiments, the ingress sensors 352 sense the presence of a liquid signaling a transmission of the event to an external location (from the box 100). Certain embodiments envision close proximity of the ingress sensors 352 to the inner surface of the top cover 102 being between 0.05-0.25 inches. Certain other embodiments envision the pillars 350 being between 0.5 and 1.75 inches long. Each ingress sensor 352 is attached to the PCB 304 via an associated wireline. In the present embodiment, there are two pillar pair element 354A and 354B that are each constructed from printed circuit board material. As shown, a first pillar 350A extends from one end of the pillar base 356 and a second pillar 350B extending from the other end of the pillar base 356. The pillar base 356 is an elongated beam. Because the pillar pair element 354A is constructed from PCB material, electrical traces can be printed on the PCB material running along the pillar 350 and pillar base 356 connecting to the PCB 304. Each pillar 354 is a U-shaped structure in the present embodiment. Certain other embodiments envision a plurality of ingress sensors 352 running along the length of each pillar 350. While other embodiments envision a plurality of ingress sensors spread out along the entire U-shaped structure 354. Other embodiments envision a plurality of ingress sensors at the corners of the main circuit board 304 and also possibly near the edges of the main circuit board 304.

Figure 5:
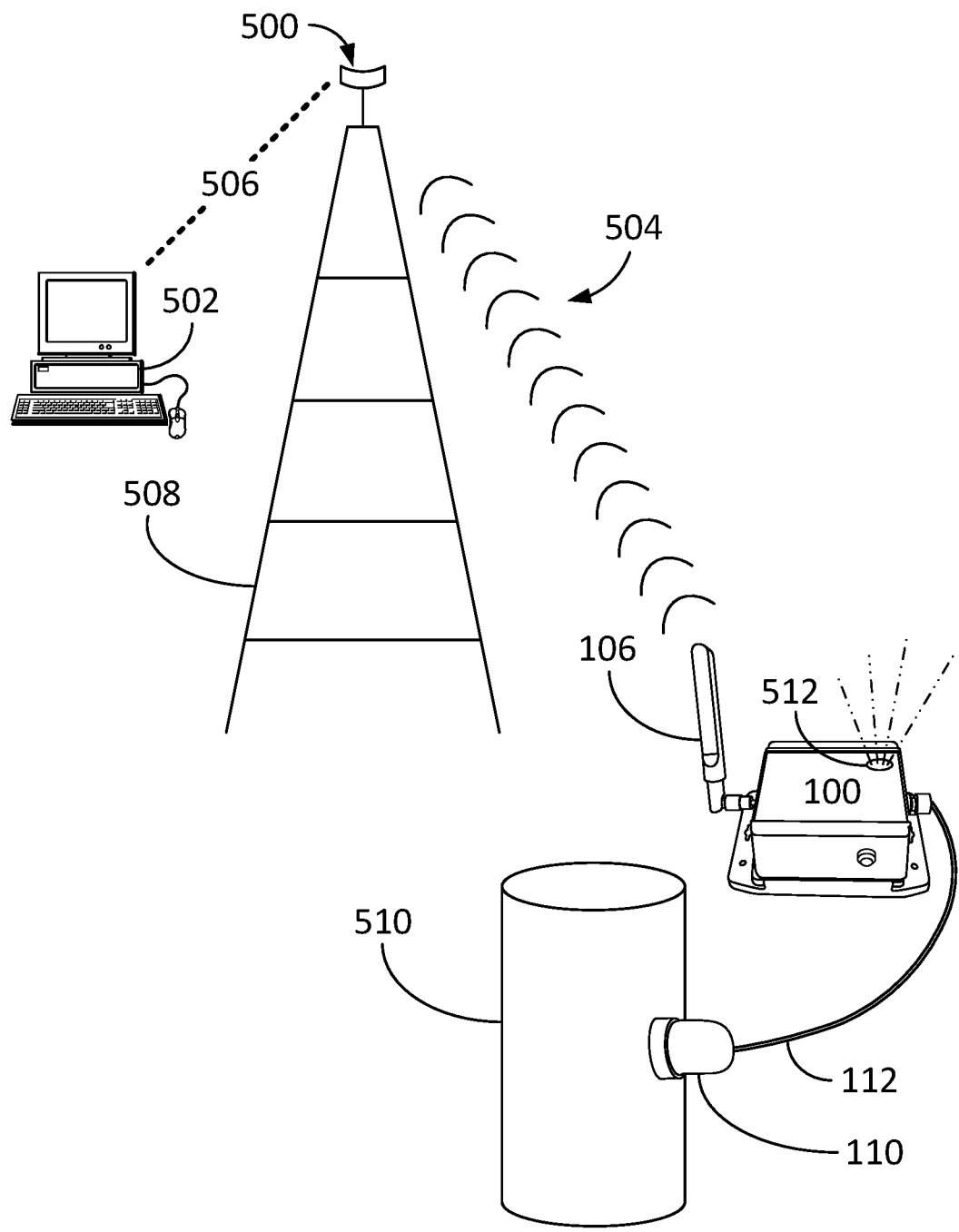
FIG. 5 is a line drawing depicting a communications arrangement between a thermal transmitting indicator of FIG. 1 and a consumer of data consistent with embodiments of the present invention.

With reference to the cell tower communications/transceiver chip 310, though fundamentally ubiquitously used in cellular phones, this technology is presently very difficult to deploy in independent devices, such as the thermal transmitting indicator 100. FIG. 5 is a line drawing depicting a communications arrangement between a thermal transmitting indicator 100 and a consumer of data consistent with embodiments of the present invention. Fundamentally, the transceiver chip 310 is essentially a two-way radio, comprising a radio transmitter and a radio receiver, that is configured to communicatively link (connect) to the nearest cell tower 508, and more particularly to the cell transceiver 500 thereby entering a cell network and/or internet. Data obtained from the sensor device 110 is converted to an appropriate electrical signal conditioned to be transmitted from the transceiver chip 310 to the cell transceiver 500 via a radio wave transmission signal 504. The transceiver chip 310 is either connected to, or integrated with, a conversion antenna that converts electrical signal from the transceiver chip 310 to the radio wave, and vice versa. The antenna 106 can be a metallic element, such as copper, that can comprise one or more compact antennas, that is specifically sized and arranged to transmit radio wave frequencies used by the cell transceiver 500.

With regards to connecting the transceiver chip 310 with one or more cell transceivers 500, certain embodiments below explore connectivity embodiments consistent with embodiments of the present invention. Some embodiments envision the thermal transmitting indicator 100 further comprising a cell tower connection indicator 512 that is integrated with the thermal transmitting indicator 110. In this embodiment, when the thermal transmitting indicator 100 is activated and connected with a cell transceiver tower 508/500, a connection light 512 visibly located on the top cover 502 or baseplate could be used indicate connectivity (such as a green light for sufficient connectivity and a red light indicating a failure to sufficiently connect). Other embodiments envision the thermal transmitting indicator 100 linking with a technician's device to indicate transceiver chip 310 connectivity with one or more cell transceivers 500. This can simply be an indication of connectivity or optionally (signal) strength of connectivity. Either way, in some embodiments the transformer electrician may adjust/pivot the antenna 106 to maximize the transmission signal strength. Yet other embodiments envision connectivity between the cell transceiver 500 and the transceiver chip 310 being validated by an end user 502 (who can see if a connection is made) that/who is connected to one or more networks 506 accessing the cell transceiver 510. Certain embodiments envision the transceiver chip 310 only capable of transmitting identifying information and transducer data generated from the sensor device 110, while other embodiments envision the transceiver chip 310 adapted to transmit positional data (the whereabouts of the transceiver chip 310, additional sensor device data, and alarm related data if a predetermined threshold of the sensor data reaches a limit thereby triggering an alarm).

Figure 6:
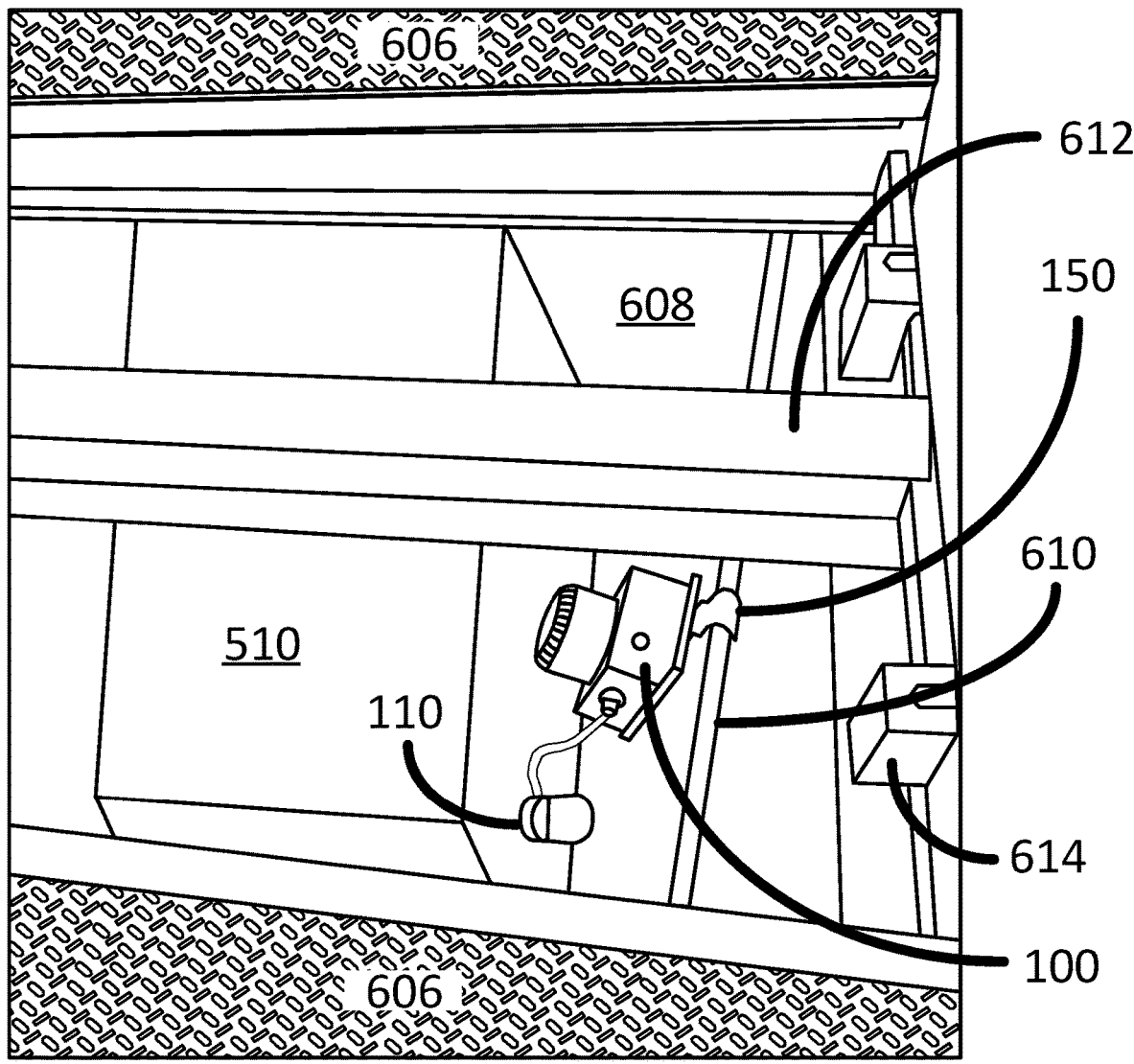
FIG. 6 illustratively depicts an electrical transformer in a subsurface transformer room monitored by a thermal transmission indicator consistent with embodiments of the present invention.

In operation, certain embodiments envision the thermal transmission indicator 100 being used in conjunction with a thermal sensor, which in one example is the sensor device 110, adapted to monitor the temperature of an electrical transformer 510. In this embodiment, the thermal transmission indicator 100 is solely capable of cooperating with an electrical transformer 510, the electrical transformer 510 being used in a utility power grid. FIG. 6 illustratively depicts an electrical transformer 510 in a subsurface chamber (also known as an underground transformer room) 608 monitored by a thermal transmission indicator 100 consistent with embodiments of the present invention. Here, the thermal transmission indicator 100 is attached to a chamber bar 610 (or some other accommodating industrial structure in the subsurface chamber 608 that is preferably above (somewhere vertically above) the electrical transformer 510) via a mounting bracket 150. In this particular example, the electrical transformer 510 is in an underground transformer room 608 on the edge of a sidewalk 606. The cover (not shown) to the underground transformer room 608 is removed for viewing. The cover (not shown) in certain examples might rest on top of an I-Beam 612 and/other support structures 614.

As previously discussed, the aging electrical grid infrastructure is replete with outdated failing transformers 510 that in some cases have been known to explode causing serious injury and death. Embodiments of the present invention address this serious problem by indicating when a transformer is in some stage of failure, potentially leading to an explosion. Given the time and expense involved in replacing electrical transformers 510 (including the downtime for replacement), a transformer technician (electrical grid worker) can deploy a thermal transducer indicator 100 with the thermal sensor 110 at each transformer 510 geographically under their supervision. At each electrical transformer 510, the transformer technician attaches a thermal sensor 110 to an electrical transformer, the thermal sensor 110 being electrically connected to the thermal transmission indicator 100. In certain embodiments, the thermal sensor 110 is magnetically connected to the steel housing of an electrical transformer 608. Certain embodiments envision the thermal sensor 110 being a thermocouple known to those skilled in the art, which does not need power to operate but rather generates a voltage upon a change in temperature. That change in voltage can be detected in the thermal transmission indicator 100 via the appropriate electrical chips integrated with the circuit board 304. The thermal transmission indicator 100 (electrically connected to the thermal sensor 110) is attached to an accommodating structure near the electrical transformer via the thermal transmission indicator mounting bracket 150.

The thermal transmission indicator 100 can come from the manufacturer/supplier already powered on (in a manufacturer set powered on state) or optionally can be turned on by the transformer technician. In the embodiment where the thermal transmission indicator 100 is already powered on from the manufacturer or supplier, there is no power switch on the outside of the thermal transmission indicator 100. In the embodiment where the thermal transmission indicator is turned on by the transformer technician, a power button or switch can be disposed on the cover of the thermal transmission indicator 100. Other embodiments envision the thermal power transmission indicator 100 being turned on remotely via a wireless switch, such as Bluetooth.

The transformer technician can confirm that the thermal transmission indicator 100, and more specifically the cellular communications chip 310, is connected to a cell tower transceiver 500 and there through, to a consumer of data/end user 502. In an effort to preserve battery life, certain embodiments envision transmitting a temperature value to the cell tower transceiver 500 in time intervals, such as hourly, six times a day, four times a day, two times a day, once a day, or some other interval that fits the need of the entity monitoring the electrical transformer/s 510. Each temperature data transmission correlates with a sampled temperature directly associated with the surface temperature of electrical transformer 510. If the temperature of the electrical transformer 510 exceeds a threshold limit as determined by the thermal transmitting indicator 100, an emergency transmission signal outside of the normal transmission interval can be transmitted to the end user 502. The emergency transmission signal can trigger an alarm at the end user location whereby the end user 502 can respond, such as by powering off the electrical transformer 510. Yet another option contemplates the thermal transmitting indicator 100 actively powering off the connected electrical transformer 510 and optionally, essentially simultaneously, alerting the end user 502 that power has been intentionally cut (turned off) to the connected electrical transformer 510.

Certain other embodiments envision a method whereby the thermal transmitting indicator 100 is constantly monitoring temperature values obtained from the temperature sensor 110 for a trigger temperature value that exceeds a predefined upper limit temperature. A predefined upper limit temperature can be a specific temperature value, such as 150° F., or a margin/percentage above an average operational temperature of the transformer. For example, if the average operational transformer's temperature is 120° F. and the percentage above is 10%, then trigger temperature value will be 132° F. If the upper limit temperature is sensed, then an alert routine is triggered. Examples of the alert routine include more closely monitoring the transformer 510, cutting power to the transformer 510, setting off an audible alarm to warn any nearby people of danger from potential exploding transformer, just to name a few. Certain embodiments envision a consumer of data 502 monitoring temperature values whereby alert routines can be triggered at the consumer of data 502 location. Certain other embodiments envision monitoring temperature values being accomplished with microprocessors/controllers 311 within the thermal transmitting indicator 100. In this scenario, appropriate intelligence on board the thermal transmitting indicator 100 can evaluate incoming temperature measurements, initiate an alert routine and can keep the consumer of data 502 abreast of any situation that arises, for example.

A number of action steps are envisioned in an alert routine. For example, in one embodiment, successive subset of temperature values can be transmitted in shortened intervals between the post trigger temperature value transmissions that is less than the pre-defined standard time interval. In other words, if the temperature of the transformer 510 is considered normal, then the normal set of temperature values are transmitted at a predefined standard time interval, e.g., sending transmissions may be once every hour, or whatever is predefined, as earlier discussed. The alert routine may implement sending a subset of ensuing temperature transmissions, such as once every minute, every five minutes, or whatever subset transmission interval is defined as reasonable. This can continue until the temperature drops back to a normal range or optionally until an electrical technician physically responds to the situation to addresses the problem. The alert routine can coincide with other actions including cutting power to the transformer, setting off an alarm, etc.

Some scenarios envision that when the transformer electrician is working near or on the electrical transformer 510, for safety reasons, they can activate the manual tool mode on/off button and LED indication 108. Certain embodiments envision that toggling the manual tool mode on/off button 108 will cause the thermal transmitting indicator 100 to transmit a set of temperature read signals to the cell tower transceiver 500 in more rapid intervals, such as every minute, every five minutes, etc. In this way, if there is a rapidly declining situation with the electrical transformer 510 leading to a dangerous impending failure situation, the transformer electrician will be warned to evacuate or vacate quickly. The cell tower transceiver 500 is also used herein to mean a cellular network because the cell tower transceiver 500 is the gateway to the cellular network and once a transmission is in possession of the cell tower transceiver 500, it is more or less essentially immediately in possession of the cellular network, which could include the internet. Other embodiments envision an auditory onboard audible alarm (such as a siren) adapted to warn the transformer electrician or passerby of a potential explosion. Certain embodiments envision the LED 127 illuminating to one or more colors, when the on/off button 108 is activated "on" (in an "on state"). After toggling the manual tool mode on/off button 108, embodiments envision the thermal transmitting indicator 100 going back to its normal transmission intervals after a set time such as 30 minutes, one hour, two hours, somewhere between or whatever is deemed reasonable. Yet other embodiments envision that the manual tool mode on/off button 108 is merely toggled again to return the thermal transmitting indicator 100 to return to its normal transmission intervals. Other embodiments envision a combination of these two scenarios if a transformer technician forgets or otherwise fails to physically toggle the manual tool mode on/off button 108. As previously discussed, certain embodiments of the thermal transmitting indicator 100 are equipped with one or more water ingress sensors 352 adapted to sense if water has infiltrated the thermal transmitting indicator 100. This could be a problem for underground transformer rooms 608 that are exposed to flash flooding. In a scenario where the water ingress sensor/s 352 senses water, the thermal transmitting indicator 100 can transmit and alert/signal to the end user 502 via the cell tower transceiver 500 where further action can be taken.

It is further envisioned that the thermal transmitting indicator 100 can possess non-transitory memory (not shown) on the PCB 304, such as a solid state memory device, flash memory, or other nonvolatile memory, that maintains a history of any measurements taken or otherwise obtained by the thermal transmitting indicator 100. Date/time stamps can also be linked with measurement history data. Any measurement history data contained in the non-transitory memory can be transmitted to a consumer of data 502 via the cellular transceiver 500 automatically or upon request, or simply can be retained in the thermal transmitting indicator 100 for later extraction/evaluation.

With the present description in mind, below are a summary of some embodiments consistent with the present invention. Just because the below elements are called out relative to the figures, they are merely examples provided to assist in the understanding of the present invention and should not be considered limiting.

Certain embodiments contemplate a transformer end-of-life thermal transmitting indicator 100 comprising: a housing 101 essentially comprised of a cover 102 and a base 104, the cover 102 and base 104 connected together to form an interior space 201; in the interior space 210 is a power supply 302 adapted to provide power to a temperature sensor 110 via a flexible electrical wire 112 and a cellular transmitter 310, the temperature sensor 110 is external to the interior space 201; an antenna 106 connected to the cellular transmitter 310 adapted to link 504 to a cellular network 500, the thermal transmitting indicator 100 configured to obtain a plurality of temperature values from the temperature sensor 110 to transmit 504 a digital representation of one of the temperature values, via the cellular transmitter 310, to an end user 502 linked 506 to the cellular network 500, the thermal transmitting indicator 100 is configured to intermittently transmit 504 the digital representation of the temperature values at a predefined time interval; and an on/off button 108 connected to the housing 101, when in an on state the thermal transmitting indicator 100 is configured to intermittently transmit one of the temperature values at a shortened time interval that is less than the predefined time interval.

The transformer end-of-life thermal transmitting indicator 100 embodiment further envisioning wherein the on state lasts between 0.5 hours and 2 hours before changing to an off state associated with the temperature values intermittently being transmitted 504 at the predefined time interval.

The transformer end-of-life thermal transmitting indicator 100 embodiment further comprising a light indicator 127 configured to indicate when the on/off button 108 is in the on state.

The transformer end-of-life thermal transmitting indicator 100 embodiment further envisioning wherein the temperature sensor 110 is adapted to read temperature values from a transformer 510 and the transformer end-of-life thermal transmitting indicator 100 is configured to specifically work with the transformer 510.

The transformer end-of-life thermal transmitting indicator of 100 embodiment further comprising an audible alarm.

The transformer end-of-life thermal transmitting indicator 100 embodiment further comprising non-transient memory 311 configured to retain a history of the temperature values.

A method embodiment contemplates a method comprising: providing a transformer end-of-life thermal transmitting indicator 100 that possesses a housing 101 essentially comprised of a cover 102 and base 104 that form an interior space 210, an antenna 106 extending from the housing 101, a temperature sensor 110 that is externally connected to the housing 101 via a wireline 112, the interior space including a power supply 302, a cellular transmitter 310 connected to a controller 311 and a computer processor 311; attaching the temperature sensor 110 an electrical device 510; the thermal transmitting indicator 100 receiving a first temperature value from the temperature sensor 110 while the temperature sensor 110 is attached to the electrical device 510; transmitting the first temperature value to a consumer of data via a cell tower 500 from the cellular transmitter 310; after transmitting the first temperature value, receiving a second temperature value from the temperature sensor 110 while the temperature sensor 110 is attached to the electrical device 510; transmitting the second temperature value from the cellular transmitter 310 to the consumer of data 502 via the cell tower 500 at a standard time interval that is defined between the first temperature transmission 504 and the second temperature transmission 504; after transmitting 504 the second temperature value, receiving a third temperature value from the temperature sensor 110 while the temperature sensor 110 is attached to the electrical device 510; and transmitting the third temperature value from the cellular transmitter 310 to the consumer of data via the cell tower 500 at the predefined standard time interval.

The method embodiment further comprising providing an on/off switch 108 externally located on the housing 101; toggling the on/off switch 108 to an on state.

The method embodiment further envisioning wherein the on/off switch further possesses a light 127 that indicates when the on/off switch 108 is in the on state.

The method embodiment further comprising after the toggling step and while in the on state, receiving a fourth temperature value from the temperature sensor 110 while the temperature sensor 110 is attached to the electrical device 510; transmitting the fourth temperature value from the cellular transmitter 310 to the consumer data 502 via the cellular tower 500; after transmitting the fourth temperature value, receiving a fifth temperature value from the temperature sensor 110 while the temperature sensor 110 is attached to the electrical device 510; transmitting the fifth temperature value from the cellular transmitter to the consumer of data 502 via the cell tower 500 at a shortened time interval that is defined between the fourth temperature transmission and the fifth temperature transmission, the shortened time interval is less than the predefined standard time interval.

The method embodiment further envisioning wherein the thermal transmitting indicator 100 continues transmitting ensuing temperature values from the temperature sensor 110 to the consumer of data 502 via the cell tower 500 at the shortened time interval for a defined period of time after the toggling step.

The method of embodiment 11 wherein the defined period of time is between 30 minutes and two hours.

The method embodiment further envisioning wherein the shortened time interval reverts back to the predefined standard time interval after the defined period of time is reached.

The method embodiment further envisioning wherein the transmitting steps are accomplished automatically from the thermal transmitting indicator 100.

The method embodiment further envisioning wherein the temperature sensor 110 is adapted to read temperature values from a transformer and the transformer end-of-life thermal transmitting indicator 100 is tailored to specifically work with the transformer 510.

The method embodiment further comprising triggering an audible alarm adapted to warn people of danger when one of the temperatures exceeds a preset limit.

The method embodiment further envisioning wherein the temperatures are taken from a transformer surface 510 and the temperature exceeding the preset limit is indicative of a potential imminent explosion.

The method embodiment further comprising transmitting a history of the temperature values to the cell tower 500, the history of the temperature values retained in non-transient memory in the interior space 210.

The method embodiment further comprising: monitoring the temperature values for a trigger temperature value defined by a later temperature measurement that exceeds a predefined upper limit temperature; sensing the trigger temperature value; after the sensing step, triggering an alert routine; during the alert routine, transmitting successive temperature values to the cellular tower 500 at a shortened interval between the transmissions that is less than the predefined standard time interval.

The method embodiment further comprising sounding an audible alarm adapted to warn people of danger when after the trigger temperature value is sensed.

The method embodiment further envisioning wherein the monitoring step and the triggering step are accomplished by the transformer end-of-life thermal transmitting indicator 100. Further embodiments contemplate the monitoring step and the triggering step are accomplished by the consumer of data 502. Other embodiments envision further comprising alerting the consumer of data 502 that the trigger temperature value was sensed.

Other embodiments of the present invention consider a liquid sensing arrangement 351 in a thermal transmitting indicator 100 comprising: a housing 101 essentially comprised of a cover 102 and a base 104, the cover 102 and base 104 connected together to form an interior space 201; a printed circuit board 304 entirely within the interior space 201, the printed circuit board 304 attached to the base 104, the printed circuit board 304 covering at least 75% of the base 104 that is confined to the interior space 210, the printed circuit board 304 defining an interior distance to a top surface of the cover 102 in the interior space 210; a cellular transmitter 310 connected to the printed circuit board 304; a battery power supply 302 within the interior space 210; a plurality of rigid pillars 350 attached to the printed circuit board 304, the rigid pillars extending and terminating at a distal end to at least 50% of the interior distance; a liquid sensor 352 disposed at essentially the distal end of each of the rigid pillars 350; each of the liquid sensors 352 powered by the battery power supply 302, the liquid sensors 352 configured to produce information of a presence of liquid in the interior space 210, the information is transmitted to the cellular transmitter 310 via the printed circuit board 304, the cellular transmitter 310 capable of transmitting a wireless signal 504 corresponding to the information to a cell hub 500 and from the cell hub 500 to a recipient 502.

The liquid sensing arrangement in a thermal transmitting indicator 100 of embodiment 24 wherein the liquid is in a form of humidity above a predetermined threshold.

Embodiment 26: The liquid sensing arrangement in a thermal transmitting indicator 100 embodiment further envisioning wherein the liquid is essentially water that has infiltrated the interior space 210.

The liquid sensing arrangement in a thermal transmitting indicator 100 embodiment further envisioning wherein the rigid pillars extending and terminating at the distal end to at least 90% of the interior distance.

The liquid sensing arrangement in a thermal transmitting indicator 100 embodiment further envisioning wherein there are four of the rigid pillars extending from four different corners of the printed circuit board.

The liquid sensing arrangement in a thermal transmitting indicator 100 embodiment further envisioning wherein the rigid pillars 350 are comprised of printed circuit board material with electrical leads printed on each of the pillars 350, the electrical leads are connected to each of the liquid sensors 352.

The liquid sensing arrangement in a thermal transmitting indicator 100 embodiment further envisioning wherein two of the rigid pillars 350A and 350B are joined at either end of a central beam 354A at the printed circuit board 304 wherein the two rigid pillars 350A and 350B and the central beam 354A are a contiguous unitary structure. This is further envisioned wherein the central beam 354A possesses electrical lead lines connected to the electrical leads, the electrical lead lines connected to the printed circuit board 304 thereby linking the liquid sensors 352 to the cellular transmitter 310 and the battery power supply 302. Optionally, this is further envisioned wherein there are two of the unitary structures 354A and 354B attached on two opposing sides of the circuit board 304. While this can further optionally be wherein a central beam width of the central beam 354A is less than two times a pillar width associated with one of the rigid pillars 350. Some embodiments consider the pillars 350 not to be rigid.

The liquid sensing arrangement in a thermal transmitting indicator 100 embodiment further envisioning wherein the housing 101 is sealed to resist but not entirely to prevent water infiltration.

The liquid sensing arrangement in a thermal transmitting indicator 100 embodiment further envisioning wherein the recipient 502 is either at least one target cellular device or at least one target Internet address.

The liquid sensing arrangement in a thermal transmitting indicator 100 further comprising a local auditory alarm that provides a warning sound when the humidity above a predetermined threshold is detected.

The liquid sensing arrangement in a thermal transmitting indicator 100 embodiment further envisioning wherein the pillars 350 extend orthogonal to the printed circuit board 304.

The above embodiments are not intended to be limiting to the scope of the invention whatsoever because many more embodiments are easily conceived within the teachings and scope of the instant specification. Moreover, the corresponding elements in the above example should not be considered limiting. It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though the sensor described herein by example is a thermal sensor, other sensors such as vibration sensor or multiple sensors, for example could equally be used with the thermal transmitting indicator 100 while still maintaining substantially the same functionality without departing from the scope and spirit of the present invention. Another example can include providing multiple alert responses without departing from the scope and spirit of the present invention. Yet another example envisions using the system with other electrical components to detect impending failure remotely without departing from the scope and spirit of the present invention. Further, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A transformer end-of-life thermal transmitting indicator comprising:
    a housing essentially comprised of a cover and a base, the cover and base connected together to form an interior space;
    in the interior space is a power supply adapted to provide electrical power to a cellular transmitter and a temperature sensor, the temperature sensor is external to the interior space;
    an antenna connected to the cellular transmitter adapted to link to a cellular network, the thermal transmitting indicator configured to obtain a plurality of temperature values from the temperature sensor to transmit a digital representation of one of the temperature values, via the cellular transmitter, to an end user linked to the cellular network, the thermal transmitting indicator is configured to intermittently transmit the digital representation of the temperature values at a predefined time interval; and
    an on/off button connected to the housing, when in an on state the thermal transmitting indicator is configured to intermittently transmit a first subset of the temperature values at a shortened time interval that is less than the predefined time interval, when in an off state the thermal transmitting indicator is configured to intermittently transmit a second subset of the temperature values at the predefined time interval.

2. The transformer end-of-life thermal transmitting indicator of claim 1 wherein the on state lasts between 0.5 hours and 2 hours before changing to an off state associated with the temperature values intermittently being transmitted at the predefined time interval.

3. The transformer end-of-life thermal transmitting indicator of claim 1 further comprising a light indicator configured to indicate when the on/off button is in the on state.

4. The transformer end-of-life thermal transmitting indicator of claim 1 wherein the temperature sensor is adapted to read temperature values from a transformer and the transformer end-of-life thermal transmitting indicator is configured to specifically work with the transformer.

5. The transformer end-of-life thermal transmitting indicator of claim 1 further comprising an audible alarm.

6. The transformer end-of-life thermal transmitting indicator of claim 1 further comprising non-transient memory configured to retain a history of the temperature values.

7. A method comprising:
    providing a transformer end-of-life thermal transmitting indicator that possesses a housing essentially comprised of a cover and base that form an interior space, an antenna extending from the housing, a temperature sensor that is externally connected to the housing, the interior space including a power supply, a cellular transmitter connected to a controller and a computer processor;
    attaching the temperature sensor an electrical device;
    the thermal transmitting indicator receiving a first temperature value from the temperature sensor while the temperature sensor is attached to the electrical device;
    transmitting the first temperature value to a consumer of data via a cell tower from the cellular transmitter;
    after transmitting the first temperature value, receiving a second temperature value from the temperature sensor while the temperature sensor is attached to the electrical device;
    transmitting the second temperature value from the cellular transmitter to the consumer of data via the cell tower at a predefined time interval that is defined between the first temperature transmission and the second temperature transmission;
    after transmitting the second temperature value, receiving a third temperature value from the temperature sensor while the temperature sensor is attached to the electrical device; and
    transmitting the third temperature value from the cellular transmitter to the consumer of data via the cell tower at the predefined standard time interval.

8. The method of claim 7 further comprising providing an on/off switch externally located on the housing; toggling the on/off switch to an on state.

9. The method of claim 8 wherein the on/off switch further possesses a light that indicates when the on/off switch is in the on state.

10. The method of claim 8 further comprising after the toggling step and while in the on state, receiving a fourth temperature value from the temperature sensor while the temperature sensor is attached to the electrical device;
transmitting the fourth temperature value from the cellular transmitter to the consumer data via the cellular tower;
after transmitting the fourth temperature value, receiving a fifth temperature value from the temperature sensor while the temperature sensor is attached to the electrical device;
transmitting the fifth temperature value from the cellular transmitter to the consumer of data via the cell tower at a shortened time interval that is defined between the fourth temperature transmission and the fifth temperature transmission, the shortened time interval is less than the predefined time interval.

11. The method of claim 10 wherein the thermal transmitting indicator continues transmitting ensuing temperature values from the temperature sensor to the consumer of data via the cell tower at the shortened time interval for a defined period of time after the toggling step.

12. The method of claim 7 further comprising triggering an audible alarm adapted to warn people of danger when one of the temperatures exceeds a preset limit.

13. The method of claim 7 further comprising transmitting a history of the temperature values to the cell tower, the history of the temperature values retained in non-transient memory in the interior space.

14. The method of claim 7 wherein the transmitting steps are accomplished automatically from the thermal transmitting indicator.

15. The method of claim 7 wherein the temperature sensor is adapted to read temperature values from a transformer and the transformer end-of-life thermal transmitting indicator is tailored to specifically work with the transformer.

* * * * *